Sept. 18, 1951

W. J. O'BRIEN 2,568,250

PHASE COMPARATOR CIRCUITS

Filed March 29, 1948

INVENTOR.
WILLIAM J. O'BRIEN
BY
Walter P. Huntley
ATTORNEY

Patented Sept. 18, 1951 2,568,250

UNITED STATES PATENT OFFICE 2,568,250

PHASE COMPARATOR CIRCUITS

William J. O'Brien, London, England, assignor to The Decca Record Company, Limited, London, England, a corporation of Great Britain Application March 29, 1948, Serial No. 17,705
In Great Britain April 1, 1947

10 Claims. (Cl. 172—245)

This invention relates to phase discriminator circuits, and has particular reference to a circuit which finds particular utility when used with phase controlled radio frequency systems such as radio frequency navigational systems of the continuous phase measurement type.

In the operation of radio frequency navigation systems of the continuous phase measurement type, it is necessary to provide means for regulating the phase relations among the various signals. Since such a regulator can only act in response to detected phase changes, it is necessary to provide a phase detector or discriminator of high sensitivity capable of detecting small changes in phase and capable of producing in response thereto relatively large changes in a control potential which may be used to effect the desired regulation. Also in such systems, it is necessary to provide a means in the mobile receivers which is capable of measuring with precision the phase relation of the received signals.

Although phase discriminator circuits were known and used prior to this invention, few of the prior circuits meet the exacting requirements mentioned above. Those of the prior circuits which meet these requiremens are complicated and costly to manufacture as well as being difficult to adjust and keep in adjustment.

It is therefore an object of this invention to provide a phase discriminator circuit which meets the requirements mentioned hereinbefore and which is simple in construction and easy to adjust and keep in adjustment.

It is also an object of this invention to provide a phase discriminator circuit which includes means for producing from two alternating input signals a direct output potential which varies as a known mathematical function of the variations in phase of the input signals.

It is a still further object of this invention to provide a phase discriminator of the character set forth in the preceding paragraphs which includes means for producing two output potentials which bear a complementary relation accurately defining the phase angle between the input signals.

It is another object of this invention to provide a phase discriminator circuit of the character set forth in the preceding paragraphs in which the output potentials are proportional to the sine and cosine of the input phase angle.

It is also an object of this invention to provide a phase discriminator circuit of the character set forth hereinbefore which includes output amplifiers for providing output currents of usable magnitude and for isolating the discriminator circuit from its load.

A further object of this invention is to provide a phase discriminator circuit of the character above set forth with an indicating device for reproducing in space an angle equal to the phase angle defined by the output potentials.

Figure 1:
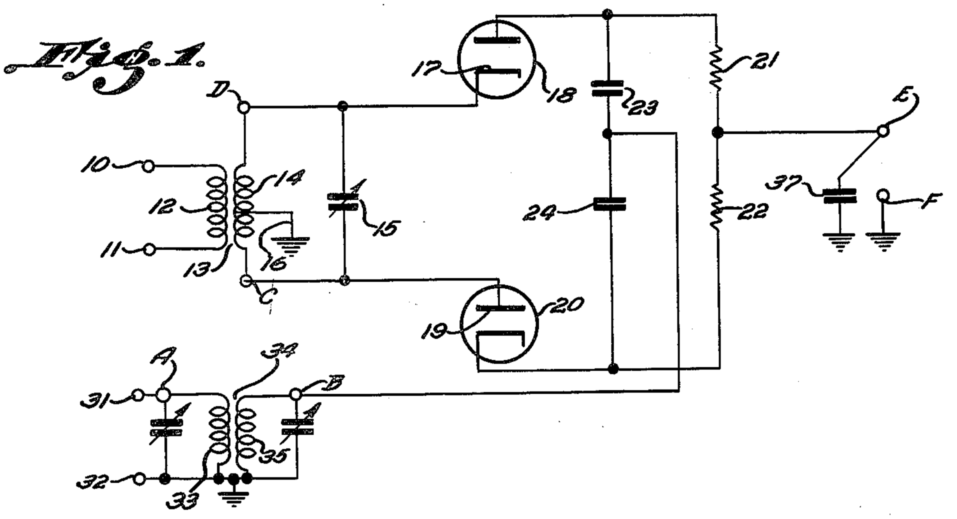
Figure 2:
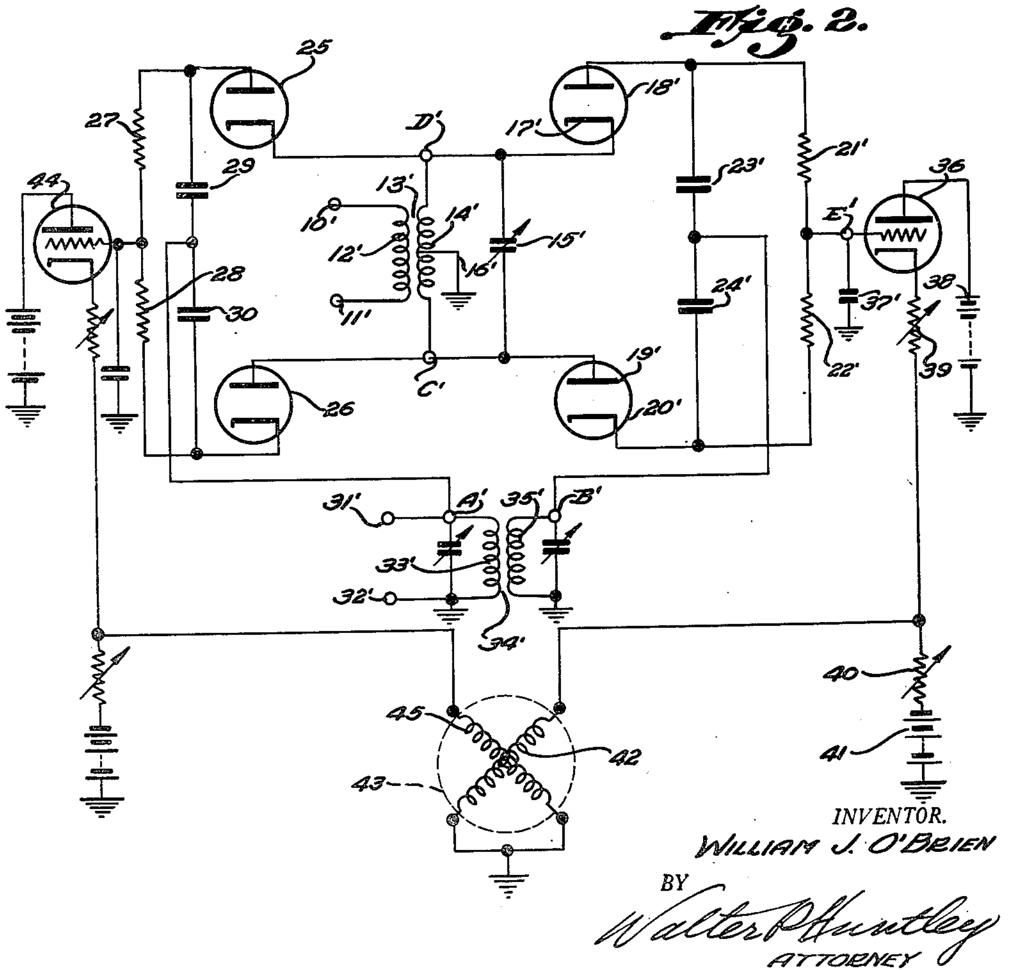

Other objects and advantages of this invention will be apparent from the following description, read in connection with the accompanying drawings, wherein:

Fig. 1 is a wiring diagram of a form of the invention which is particularly suited to the development of a control potential which may be used to control the action of an electronic phase regulator; and Fig. 2 is a wiring diagram of a form of the invention which is particularly suited to operating an indicating device for directly indicating the phase angle between two input signals.

Referring to the drawings, Fig. 1 illustrates a simple circuit for producing from two alternating input signals an output potential which is proportional to the sine of the phase angle between the input signals. One of the input signals is applied to input terminals 10 and 11 which are connected to a primary winding 12 of a transformer 13, a secondary winding 14 of which is tuned to the frequency of the input signal by a tuning condenser 15 connected in shunt across the winding 14. The secondary winding 14 is grounded at its midpoint as indicated at 16 so that a phase opposition relation obtains between the signals at the two ends C and D of the winding 14.

The point D is connected to the cathode 17 of a rectifier 18 and the point C is connected to the anode 19 of a rectifier 20. The anode of the rectifier tube 18 and the cathode of the rectifier tube 20 are connected together through two equal series connected resistances 21 and 22. Two series connected condensers 23 and 24 of equal capacity are connected in shunt with the series connected resistances 21 and 22.

The second input signal is applied to input terminals 31 and 32 which are connected to a tuned primary winding 33 of a transformer 34, a secondary winding 35 being also tuned to the frequency of the input signal. The lower ends of the windings 33 and 35 are grounded and the Q, coupling, and secondary tuning of the transformer 34 are adjusted to produce equal signal potentials bearing a phase quadrature relation to each other at the upper ends A and B of the windings 33 and 35.

Point B is connected as shown to the midpoint between the two series connected condensers 23 and 24 so that the signal potentials applied across the rectifiers 18 and 20 are respectively the vector sum of the potentials at points B and D and the vector sum of the potentials at points B and C. The midpoint between the two series connected resistances 21 and 22 is connected to one output terminal E which is also connected to ground through a bypass condenser 37. A second output terminal F is connected directly to ground.

In operation, the circuit described produces across the output terminals E and F a direct potential which is proportional to the sine of the phase angle between the two input signals. The manner in which this result obtains is seen by noting that to direct current the winding 14 has a negligible resistance so that the direct potential across the two series connected resistances 21 and 22 is equal to the sum of the magnitudes of the rectified potentials across the rectifiers 18 and 20. Since the midpoint of the winding 14 is grounded, the potential from ground to the midpoint between resistances 21 and 22 (i. e. the potential across the output terminals E and F) is proportional to the difference between the rectified potentials across the rectifiers 18 and 20. As hereinbefore stated, however, the signal potentials across these two rectifiers are respectively the vector sum of the potentials at points B and D and the vector sum of the potentials at points B and C. Hence, the difference between the rectified potentials across the rectifiers 18 and 20 (and therefore the output potential) is proportional to the cosine of the phase angle between the signal potentials at points B and D. Since the signal at point D is in phase with the input signal applied to the input terminals 10 and 11 while the signal at point B bears a phase quadrature relation to the input signal applied to the input terminals 31 and 32, it follows that the output potential across the terminals E and F is proportional to the sine of the phase angle between the two input signals. As before stated, this output potential may be used for controlling the operation of phase regulating equipment, or may be used to operate a suitable indicator.

For the purpose of operating a phase angle indicator, a circuit such as that shown in Fig. 2 is preferred because it completely eliminates ambiguities and will accurately indicate any phase angle between zero and 360°. A substantial part of the circuit of Fig. 2 is identical to that shown in Fig. 1. To simplify the ensuing description these parts have been designated by primed reference characters otherwise identical to the reference characters used for like parts in Fig. 1.

Referring now to Fig. 2, points D′ and C′ are connected respectively to the cathode of a rectifier 25 and the anode of a rectifier 26. The complementary elements of these rectifiers are connected together by series connected resistances 27 and 28 which are shunted by series connected condensers 29 and 30 of equal capacity. The midpoint between condensers 29 and 30 is connected as shown to the point A′ so that the signal potentials applied across the rectifiers 25 and 26 are respectively the vector sum of the potentials at points A′ and D′ and the vector sum of the potentials at points A′ and C′. It follows, in the manner hereinbefore explained, that the potential at the midpoint between resistances 27 and 28 is proportional to the cosine of the phase angle between the two input signals, while the potential at the output point E′ is proportional to the sine of the phase angle.

For the purposes of providing output currents of substantial magnitude and for isolating the discriminator proper from its load, use is made of direct current amplifiers connected between the output points and the indicating device. Accordingly, the output terminal E′ is connected to the control grid of a cathode follower amplifier tube 36, the anode of which is maintained at a positive potential as by means of a battery 38. The cathode of the tube 36 is connected to the negative terminal of a suitable source of bias supply such as the battery 41 through a variable cathode resistance 39 and a variable bias resistance 40, the positive terminal of the battery 41 being connected to ground.

The junction between the resistances 39 and 40 is connected to one end of one coil 42 of a crossed coil indicating instrument 43 and the other end of the coil 42 is grounded. A similar amplifier circuit employing a cathode follower amplifier tube 44 is connected from the midpoint between resistances 27 and 28 to one end of a second coil 45 of the crossed coil instrument 43, the other end of the coil 45 also being grounded. The adjustable cathode resistance 39 and adjustable bias resistance 40 are so adjusted that no current flows through the coil 42 when the grid of the tube 36 is at ground potential. The corresponding resistances for the tube 44 are similarly adjusted.

It will be seen that the amplifiers 36 and 44 operate to cause direct currents to flow in the coils 42 and 45 which are respectively proportional to the sine and cosine of the phase angle between the two input signals. In a properly designed crossed coil instrument, the separate magnetic field components induced by these currents lie exactly at right angles to each other and their strengths are exactly proportional to the magnitudes of the coil currents. It follows that the resultant field will lie at an angle which is precisely the same as the phase angle between the two input signals. The direction of the resultant magnetic field is indicated by a pointer attached to a small permanent magnet mounted for rotation in the resultant field.

From the foregoing it will be observed that the invention described herein provides a phase discriminator circuit which is simple in construction, and dependable in operation. Attention is directed particularly to the fact that the form of the invention illustrated in Fig. 1 provides a single output potential, the magnitude of which is a known mathematical function of the phase angle between the two input signals, while in the form of the invention which is illustrated in Fig. 2 there is developed a pair of output potentials the magnitudes of which are known complementary mathematical functions of the phase angle between the two input signals.

While there has been illustrated and described herein the preferred embodiments of the invention, the same is not to be limited to the details described, except as defined in the appended claims.

I claim:

1. In a phase discriminator circuit for producing a direct control potential the magnitude of which is a function of the phase angle between a first and a second input signal of a given radio frequency, the combination of: means for producing from one of said signals a third signal of said given frequency and bearing a fixed phase opposition relation to said second signal; a pair of rectifiers; circuit means for applying to one of said rectifiers the vector sum of said first and second signals; circuit means for applying to the other of said rectifiers the vector sum of said first and third signals; and a pair of equal series connected resistances connected between said rectifiers, said resistances being connected to rectifier terminals of opposite polarity whereby the direct potential of the midpoint between said resistances is proportional to the cosine of the phase angle between said first and second input signals.

2. In a phase discriminator circuit for producing a direct control potential the magnitude of which is a function of the phase angle between a first and a second input signal of a given radio frequency, the combination of: means for producing from one of said signals a third signal of said given frequency and bearing a fixed phase quadrature relation to said first signal; means for producing from the other of said input signals a fourth signal of said given frequency and bearing a fixed phase opposition relation to said second signal; a pair of rectifiers; circuit means for applying to one of said rectifiers the vector sum of said second and third signals; circuit means for applying to the other of said rectifiers the vector sum of said third and fourth signals; and a pair of equal series connected resistances connected between said rectifiers, said resistances being connected to rectifier terminals of opposite polarity whereby the direct potential of the midpoint between said resistances is proportional to the sine of the phase angle between said first and second input signals.

3. In a phase discriminator circuit for producing a direct control potential the magnitude of which is a function of the phase angle between a first and a second input signal of a given radio frequency, the combination of: a transformer having a primary to which said second signal is applied and having a secondary which is grounded at its midpoint; a pair of rectifiers each having an anode and a cathode; means connecting the cathode of one of said rectifiers to one end of said secondary; means connecting the anode of the other of said rectifiers to the other end of said secondary; a pair of series connected condensers connected between the anode of said one rectifier and the cathode of said other rectifier; means for applying said first input signal to the junction between said condensers; and a pair of series connected resistances connected in parallel with said series connected condensers, whereby the direct potential of the junction between said series connected resistances is proportional to the cosine of the phase angle between said first and second input signals.

4. In a phase discriminator circuit for producing a direct control potential the magnitude of which is a function of the phase angle between a first and a second input signal of a given radio frequency, the combination of: a transformer having a primary to which said second signal is applied and having a secondary which is grounded at its midpoint; a pair of rectifiers each having an anode and a cathode; means connecting the cathode of one of said rectifiers to one end of said secondary; means connecting the anode of the other of said rectifiers to the other end of said secondary; a pair of series connected condensers connected between the anode of said one rectifier and the cathode of said other rectifier; means for producing from said first input signal a third signal of said given frequency and bearing a phase quadrature relation to said first input signal; means for applying said third signal to the junction between said series connected condensers; and a pair of series connected resistances connected in parallel with said series connected condensers, whereby the direct potential of the junction between said series connected resistances is proportional to the sine of the phase angle between said first and second input signals.

5. In a phase discriminator circuit for determining the phase angle between a first and a second input signal of a given radio frequency, the combination of: a transformer having a primary to which said second signal is applied and having a secondary which is grounded at its mid-point; four rectifiers, each having an anode and a cathode; means connecting one end of said secondary to the cathodes of the first and second of said four rectifiers; means connecting the other end of said secondary to the anodes of the third and fourth of said rectifiers; one pair of series connected condensers connected between the anode of said first rectifier and the cathode of said third rectifier; means for applying said first input signal to the junction between said one pair of series connected condensers; another pair of series connected condensers connected between the anode of said second rectifier and the cathode of said fourth rectifier; means for producing from said first input signal a third signal of said given frequency and bearing a phase quadrature relation to said first input signal; means for applying said third signal to the junction between said other pair of series connected condensers; a first pair of series connected resistances connected in parallel with said one pair of condensers; and a second pair of series connected resistances connected in parallel with said other pair of condensers, whereby the ratio of the potentials of the midpoints between resistances of each of said pairs is equal to the cotangent of the phase angle between said first and second input signals.

6. In a phase discriminator circuit for determining the phase angle between a first and a second input signal of a given radio frequency, the combination of: a transformer having a primary to which said second signal is applied and having a secondary which is grounded at its midpoint; four rectifiers, each having an anode and a cathode; means connecting one end of said secondary to the cathode of the first and second of said four rectifiers; means connecting the other end of said secondary to the anodes of the third and fourth of said rectifiers; one pair of series connected condensers connected between the anode of said first rectifier and the cathode of said third rectifier; means for applying said first input signal to the junction between said one pair of series connected condensers; another pair of series connected condensers connected between the anode of said second rectifier and the cathode of said fourth rectifier; means for producing from said first input signal a third signal of said given frequency and bearing a phase quadrature relation to said first input signal; means for applying said third signal to the junction between said other pair of series connected condensers; a first pair of series connected resistances connected in parallel with said one pair of condensers; a second pair of series connected resistances connected in parallel with said other pair of condensers; a crossed coil permanent magnet indicating instrument; and circuit means connecting the coils of said instrument respectively to the junction points between the resistances of each of said pairs.

7. In a phase discriminator circuit for determining the phase angle between a first and a second input signal of a given radio frequency, the combination of: a transformer having a primary to which said second signal is applied and having a secondary which is grounded at its midpoint; four rectifiers, each having an anode and a cathode; means connecting one end of said secondary to the cathode of the first and second of said four rectifiers; means connecting the other end of said secondary to the anodes of the third and fourth of said rectifiers; one pair of series connected condensers connected between the anode of said first rectifier and the cathode of said third rectifier; means for applying said first input signal to the junction between said one pair of series connected condensers; another pair of series connected condensers connected between the anode of said second rectifier and the cathode of said fourth rectifier; means for producing from said first input signal a third signal of said given frequency and bearing a phase quadrature relation to said first input signal; means for applying said third signal to the junction between said other pair of series connected condensers; a first pair of series connected resistances connected in parallel with said one pair of condensers; a second pair of series connected resistances connected in parallel with said other pair of condensers; a crossed coil permanent magnet indicating instrument; circuit means connecting the coils of said instrument respectively to the junction points between the resistances of each of said pairs; and direct current amplifiers connected between each of said coils and the corresponding ones of said junction points.

8. In a phase discriminator circuit for producing a direct control potential, the magnitude of which is a function of the phase angle between a first and a second input signal of a given radio frequency, the combination of: means for producing from said second signal a third signal of said given frequency and bearing a fixed phase opposition relation to said second signal; a pair of rectifiers; circuit means for applying to one of said rectifiers the vector sum of said first and second signals; circuit means for applying to the other of said rectifiers the vector sum of said first and third signals; a pair of equal series connected load resistances connected between said rectifiers, said load resistances being connected to rectifier terminals of opposite polarity; and a circuit of low resistance connecting the other terminal of each of said rectifiers to ground to define a direct current circuit comprising in series said pair of rectifiers and said pair of load resistances for producing equal direct potentials across said load resistances, whereby the direct potential between ground and the junction of said load resistances is equal to one-half the difference in direct potentials across said rectifiers.

9. In a phase discriminator circuit for producing a direct control potential, the magnitude of which is a function of the phase angle between a first and a second input signal of a given radio frequency, the combination of: means for producing from said second signal a third signal of said given frequency and bearing a fixed phase opposition relation to said second signal; a pair of rectifiers; circuit means for applying to one of said rectifiers the vector sum of said first and second signals; circuit means for applying to the other of said rectifiers the vector sum of said first and third signals; a pair of equal series connected load resistances connected between said rectifiers, said load resistances being connected to rectifier terminals of opposite polarity; and circuit means for holding the direct potential of the other terminal of each of said rectifiers at ground potential to define a common direct current circuit for both of said rectifiers through both of said load resistances, whereby the direct potential of the mid-point between said resistances is proportional to the cosine of the phase angle between said first and second input signals.

10. In a phase discriminator circuit for producing a direct control potential, the magnitude of which is a function of the phase angle between a first and a second input signal of a given radio frequency, and each comprising an electrical potential alternating in polarity relative to a common bus, the combination of: means for producing from said second signal a third signal of said given frequency and bearing a fixed phase opposition relation to said second signal; a pair of rectifiers; circuit means for applying to one of said rectifiers the vector sum of said first and second signals relative to said common bus; circuit means for applying to the other of said rectifiers the vector sum of said first and third signals relative to said common bus; a pair of equal series connected load resistances connected between said rectifiers, said load resistances being connected to rectifier terminals of opposite polarity; and a circuit of low resistance connecting the other terminal of each of said rectifiers to said common bus to define a common direct current circuit for both of said rectifiers through both of said load resistances to thereby produce equal direct currents in said load resistances and equal direct potentials across said resistances, whereby the direct potential of the midpoint between said resistances relative to said common bus is substantially proportional to the cosine of the phase angle between said first and second input signals.

WILLIAM J. O'BRIEN.

REFERENCES CITED

The following references are of record in the file of this patent:

UNITED STATES PATENTS

| Number | Name | Date |
|---|---|---|
| 2,281,995 | Purington | May 5, 1942 |
| 2,410,843 | Shepherd | Nov. 12, 1946 |
| 2,424,131 | Warnick | July 15, 1947 |
| 2,454,807 | Kennedy | Nov. 30, 1948 |
| 2,467,361 | Blewett | Apr. 12, 1949 |